(12) United States Patent
Yang et al.

(10) Patent No.: US 11,809,300 B2
(45) Date of Patent: Nov. 7, 2023

(54) TRACE CHAIN INFORMATION QUERY METHOD AND DEVICE

(71) Applicant: HUAWEI CLOUD COMPUTING TECHNOLOGIES CO., LTD., Gui'an New District (CN)

(72) Inventors: Xiaofeng Yang, Shenzhen (CN); Dongmei Xie, Nanjing (CN); Zhong Sheng, Nanjing (CN); Taotao Liu, Nanjing (CN); Kaifang Ding, Nanjing (CN); Cheng Li, Nanjing (CN); Feng Ye, Hangzhou (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 127 days.

(21) Appl. No.: 17/412,884

(22) Filed: Aug. 26, 2021

(65) Prior Publication Data
US 2021/0390031 A1    Dec. 16, 2021

Related U.S. Application Data

(63) Continuation of application No. PCT/CN2019/105707, filed on Sep. 12, 2019.

(30) Foreign Application Priority Data

Feb. 27, 2019    (CN) .......................... 201910147125.X

(51) Int. Cl.
*G06F 11/00*    (2006.01)
*G06F 11/34*    (2006.01)
(Continued)

(52) U.S. Cl.
CPC ...... *G06F 11/3476* (2013.01); *G06F 11/3006* (2013.01); *G06F 11/3075* (2013.01); *G06F 11/328* (2013.01)

(58) Field of Classification Search
CPC ............. G06F 2201/86; G06F 11/3636; G06F 11/3476; G06F 11/3075; G06F 11/3072; G06F 11/323
See application file for complete search history.

(56) References Cited

U.S. PATENT DOCUMENTS 7,689,610 B2 *  3/2010  Bansal .................... H04L 67/56
                                                    707/999.006
9,875,167 B1 *  1/2018  Norrie ................. G06F 11/3495
(Continued)

FOREIGN PATENT DOCUMENTS

CN    103177115 A    6/2013
CN    106487596 A    3/2017
(Continued)

OTHER PUBLICATIONS

European Search Report issued in corresponding European Application No. 19917001.0, dated Feb. 22, 2022, pp. 1-9.
(Continued)

*Primary Examiner* — Charles Ehne
(74) *Attorney, Agent, or Firm* — HAUPTMAN HAM, LLP

(57) ABSTRACT

This application provides a trace chain information query method, including: receiving, by a trace chain server, first trace chain information sent by a first service node and second trace chain information sent by a second service node, where the first service node is a service node in a first trace chain, the second service node is a service node in a second trace chain, both the first trace chain and the second trace chain are generated as triggered by a same user operation, the first trace chain information includes a group identifier, the second trace chain information includes the group identifier, and the group identifier is used to indicate the user operation; and finding, by the trace chain server, the
(Continued)

first trace chain information and the second trace chain information based on the group identifier.

11 Claims, 13 Drawing Sheets

(51) Int. Cl.
*G06F 11/30* (2006.01)
*G06F 11/32* (2006.01)

(56) References Cited

U.S. PATENT DOCUMENTS

| | | |
|---|---|---|
| 2012/0042255 A1 | 2/2012 | Vaidya et al. |
| 2017/0324651 A1 | 11/2017 | Penno et al. |
| 2018/0131590 A1 | 5/2018 | Penno et al. |
| 2018/0285233 A1* | 10/2018 | Norrie .................... G06F 9/542 |

FOREIGN PATENT DOCUMENTS

| | | |
|---|---|---|
| CN | 106656536 A | 5/2017 |
| CN | 106790718 A | 5/2017 |
| CN | 107580018 A | 1/2018 |
| CN | 108038145 A | 5/2018 |
| CN | 108205486 A | 6/2018 |
| CN | 108632111 A | 10/2018 |
| CN | 109981349 A | 7/2019 |

OTHER PUBLICATIONS

International Search Report issued in corresponding International Application No. PCT/CN2019/105707, dated Dec. 3, 2019, pp. 1-9.
Chinese Office Action issued in corresponding Chinese Application No. 201910147125.X, dated Jun. 28, 2020, pp. 1-5.
Chinese Office Action issued in corresponding Chinese Application No. 201910147125.X, dated Nov. 13, 2020, pp. 1-6.

* cited by examiner

TRACE CHAIN INFORMATION QUERY METHOD AND DEVICE

CROSS-REFERENCE TO RELATED APPLICATIONS

This application is a continuation of International Application No. PCT/CN2019/105707, filed on Sep. 12, 2019, which claims priority to Chinese Patent Application No. 201910147125.X, filed on Feb. 27, 2019, the disclosure of which is hereby incorporated by reference in its entirety.

TECHNICAL FIELD

This application relates to the trace chain field, and in particular, to a trace chain information query method and a device.

BACKGROUND

Currently, a trace chain technology is a frequently-used service running method. A series of service nodes are used, based on a specific sequence, as a trace chain for a user, to provide various services for the user. The trace chain technology can be used to trace an application request and restore an execution track and an execution state of the application request in an application system in a visualized manner, to quickly locate a fault and a performance bottleneck.

However, a person skilled in the art finds, in a long-term research, that an existing trace chain technology has a relatively large limitation, and cannot be used for performing tracing and locating in a multi-trace chain scenario.

SUMMARY

This application provides a trace chain information query method, to query trace chain information in a complex trace chain scenario.

According to a first aspect, a trace chain information query method is provided. The method includes:

A trace chain server receives first trace chain information sent by a first service node and second trace chain information sent by a second service node. The first service node is a service node in a first trace chain. The second service node is a service node in a second trace chain. Both the first trace chain and the second trace chain are generated as triggered by a same user operation. The first trace chain information includes a group identifier. The second trace chain information includes the group identifier.

The trace chain server obtains the group identifier, and finds the first trace chain information and the second trace chain information based on the group identifier.

The trace chain server separately queries the first trace chain information and the second trace chain information, to locate a fault in an application generated by the user operation.

In some possible designs, the first trace chain information further includes an identifier of the first trace chain, and the trace chain server finds the first trace chain information based on the identifier of the first trace chain; or the second trace chain information further includes an identifier of the second trace chain, and the trace chain server finds the second trace chain information based on the identifier of the second trace chain.

In some possible designs, the group identifier includes any one or more of an operation identifier, a user identifier, and a timestamp. The operation identifier is used to indicate an operation of the user. The user identifier is used to indicate an identity of the user. The timestamp is used to indicate a time point at which the user performs the operation. The method further includes:

The trace chain server searches based on a search keyword, trace chain information including the search keyword. The search keyword includes any one or more of the operation identifier, the user identifier, and the timestamp.

In some possible designs, the user operation is page loading or a control operation.

When the operation of the user is the page loading, the operation identifier includes a first uniform resource locator URL. The first URL is a URL of a loaded page.

When the operation of the user is the control operation, the operation identifier includes a second URL, a control name, and an operation type. The second URL is a URL of a page on which an operated control is located. The control name is a name of the operated control. The operation type is a type of an operation performed on the operated control.

According to a second aspect, a trace chain information generation method is provided. The method includes:

A first service node obtains a group identifier and an identifier of a first trace chain. The first service node is a service node in the first trace chain. The first trace chain is generated as triggered by a user operation.

The first service node generates first trace chain information. The first trace chain information includes the group identifier and the identifier of the first trace chain.

A second service node obtains the group identifier and an identifier of a second trace chain. The second service node is a service node in the second trace chain. The second trace chain is generated as triggered by the user operation.

The second service node generates second trace chain information. The second trace chain information includes the group identifier and the identifier of the second trace chain.

In some possible designs, the group identifier includes any one or more of an operation identifier, a user identifier, and a timestamp. The operation identifier is used to indicate an operation of the user. The user identifier is used to indicate an identity of the user. The timestamp is used to indicate a time point at which the user performs the operation. The method further includes:

inputting a search keyword, where the search keyword includes one or more of the operation identifier, the user identifier, and the timestamp; and displaying trace chain information including the search keyword.

In some possible designs, the user operation is page loading or a control operation.

When the operation of the user is the page loading, the operation identifier includes a first uniform resource locator URL. The first URL is a URL of a loaded page.

When the operation of the user is the control operation, the operation identifier includes a second URL, a control name, and an operation type. The second URL is a URL of a page on which an operated control is located. The control name is a name of the operated control. The operation type is a type of an operation performed on the operated control.

According to a third aspect, a trace chain server is provided. The server includes a receiving module and an obtaining module.

The receiving module is configured to receive first trace chain information sent by a first service node and second trace chain information sent by a second service node. The first service node is a service node in a first trace chain. The second service node is a service node in a second trace chain. Both the first trace chain and the second trace chain are generated as triggered by a same user operation. The first trace chain information includes a group identifier. The second trace chain information includes the group identifier.

The obtaining module is configured to obtain the group identifier, and find the first trace chain information and the second trace chain information based on the group identifier.

The query module is configured to separately query the first trace chain information and the second trace chain information, to locate a fault in an application generated by the user operation.

In some possible designs, the first trace chain information further includes an identifier of the first trace chain, and the query module is further configured to find the first trace chain information based on the identifier of the first trace chain; or the second trace chain information further includes an identifier of the second trace chain, and the query module is further configured to find the second trace chain information based on the identifier of the second trace chain.

In some possible designs, the group identifier includes any one or more of an operation identifier, a user identifier, and a timestamp. The operation identifier is used to indicate an operation of the user. The user identifier is used to indicate an identity of the user. The timestamp is used to indicate a time point at which the user performs the operation.

The query module is further configured to search based on a search keyword, trace chain information including the search keyword. The search keyword includes any one or more of the operation identifier, the user identifier, and the timestamp.

In some possible designs, the user operation is page loading or a control operation.

When the operation of the user is the page loading, the operation identifier includes a first uniform resource locator URL. The first URL is a URL of a loaded page.

When the operation of the user is the control operation, the operation identifier includes a second URL, a control name, and an operation type. The second URL is a URL of a page on which an operated control is located. The control name is a name of the operated control. The operation type is a type of an operation performed on the operated control.

According to a fourth aspect, an application system is provided. The system includes a first service node and a second service node.

The first service node is configured to obtain a group identifier and an identifier of a first trace chain. The first service node is a service node in the first trace chain. The first trace chain is generated as triggered by a user operation.

The first service node is configured to generate first trace chain information. The first trace chain information includes the group identifier and the identifier of the first trace chain.

The second service node is configured to obtain the group identifier and an identifier of a second trace chain. The second service node is a service node in the second trace chain. The second trace chain is generated as triggered by the user operation.

The second service node is configured to generate second trace chain information. The second trace chain information includes the group identifier and the identifier of the second trace chain.

In some possible designs, the group identifier includes any one or more of an operation identifier, a user identifier, and a timestamp. The operation identifier is used to indicate an operation of the user. The user identifier is used to indicate an identity of the user. The timestamp is used to indicate a time point at which the user performs the operation.

The first service node is configured to input a search keyword. The search keyword includes one or more of the operation identifier, the user identifier, and the timestamp.

The first service node is configured to output trace chain information including the search keyword.

In some possible designs, the user operation is page loading or a control operation.

When the operation of the user is the page loading, the operation identifier includes a first uniform resource locator URL. The first URL is a URL of a loaded page.

When the operation of the user is the control operation, the operation identifier includes a second URL, a control name, and an operation type. The second URL is a URL of a page on which an operated control is located. The control name is a name of the operated control. The operation type is a type of an operation performed on the operated control.

According to a fifth aspect, a trace chain server is provided. The server includes a processor and a memory. The processor is configured to execute code in the memory, to perform the method in any one of the possible designs in the first aspect.

According to a sixth aspect, an application system is provided. The system includes a first service node and a second service node. Each service node includes a processor and a memory. A processor of the first service node is configured to execute code in a memory of the first service node, to perform a step that a first service node obtains a group identifier and an identifier of a first trace chain and generates first trace chain information according to any one of the method in the second aspect. A processor of the second service node is configured to execute code in a memory of the second service node, to perform the steps that the second service node obtains the group identifier and the identifier of the second trace chain and generates the second trace chain information according to the method in any one of the possible designs in the second aspect.

In the foregoing solutions, the application system associates trace chain information of different trace chains by using the group identifier. Therefore, the trace chain server may find, by using the group identifier, trace chain information including the group identifier, and query the trace chain information in the complex trace chain scenario.

BRIEF DESCRIPTION OF DRAWINGS

To describe the technical solutions in embodiments of this application or in the background more clearly, the following describes the accompanying drawings for describing the embodiments of this application or the background.

DESCRIPTION OF EMBODIMENTS

Terms used in embodiments of this application are merely used to explain specific embodiments of the present invention, but are not intended to limit the present invention.

An application can be implemented by invoking a plurality of services in sequence based on an invoking relationship. The application may be a purchase application, a payment application, a recharge application, or the like. A service may be product management, user management, subscription relationship management, charging management, cloud service resource management, or the like.

Figure 1:
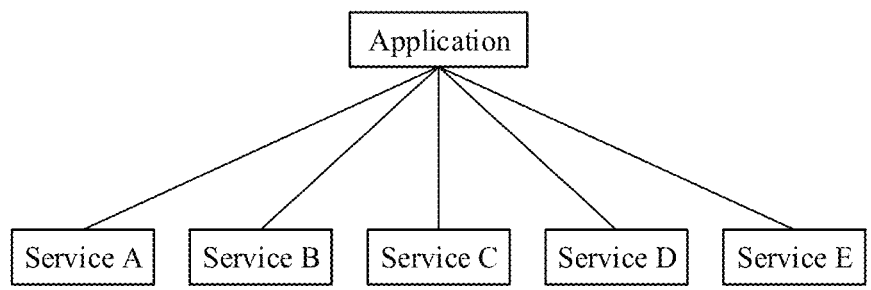
FIG. 1 is a schematic diagram of a relationship between an application and a service according to an embodiment of this application.

A complex application may be simplified into a plurality of simple services. Each of the plurality of services focuses on only one task in the application. Tasks between the plurality of services are independent of each other or loosely coupled (namely, not much or little coupling). For example, as shown in FIG. 1, a complex application may be divided into five simple services: a service A to a service E. Each of the service A to the service E focuses on only one task in the application. Tasks of the service A to the service E are independent of each other.

Figure 2:
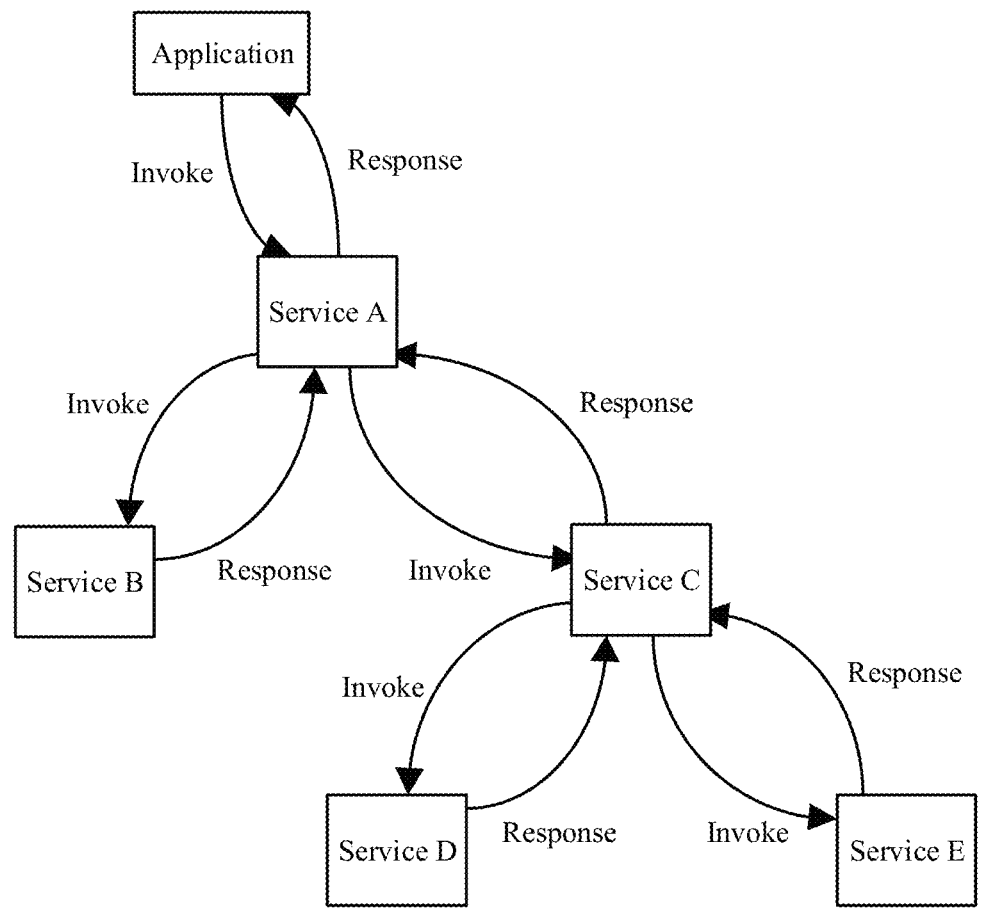
FIG. 2 is a schematic diagram of an invoking relationship between an application and a service in a single trace chain scenario according to an embodiment of this application.

An invoking relationship reflects an invoking sequence of a plurality of services in an application. As shown in FIG. 2, an invoking relationship may be described as follows: A user sends an application request to a service A. The service A executes an application according to the application request and invokes a service B to provide a service. After providing the service, the service B returns a response to the service A. The service A continues to execute the application based on the response returned by the service B and invokes a service C to provide a service. Then, the service C invokes a service D to provide a service. After providing the service, the service D returns a response to the service C. The service C invokes a service E to provide a service. After providing the service, the service E returns a response to the service C, and the service C returns a response to the service A. The service A continues to process the application based on the response returned by the service C. After the application is complete, the service A returns a response to the user.

It should be understood that the application, the service, and the invoking relationship are merely examples, and should not constitute a specific limitation.

The application may be proposed by a client and implemented in an application system. Herein, the client may be a terminal device, for example, a mobile phone, a tablet computer, a notebook computer, or a desktop computer. This is not specifically limited herein. In a specific embodiment, the user may propose the application request on a browser on the client. The application system may include a plurality of service nodes. Each service in the application may be independently deployed on one service node. A service node may be a browser server, a mail server, a web page server, a file server, or the like. This is not specifically limited herein. In this case, the application system traces a corresponding service node in sequence based on the invoking relationship to complete the application. For example, a corresponding application system for the application in FIG. 2 may be shown in FIG. 3. Certainly, two or more services may also be deployed on a same service node. This is not specifically limited herein. For ease of description, the following uses an example in which each service is independently deployed on one service node.

Figure 3:
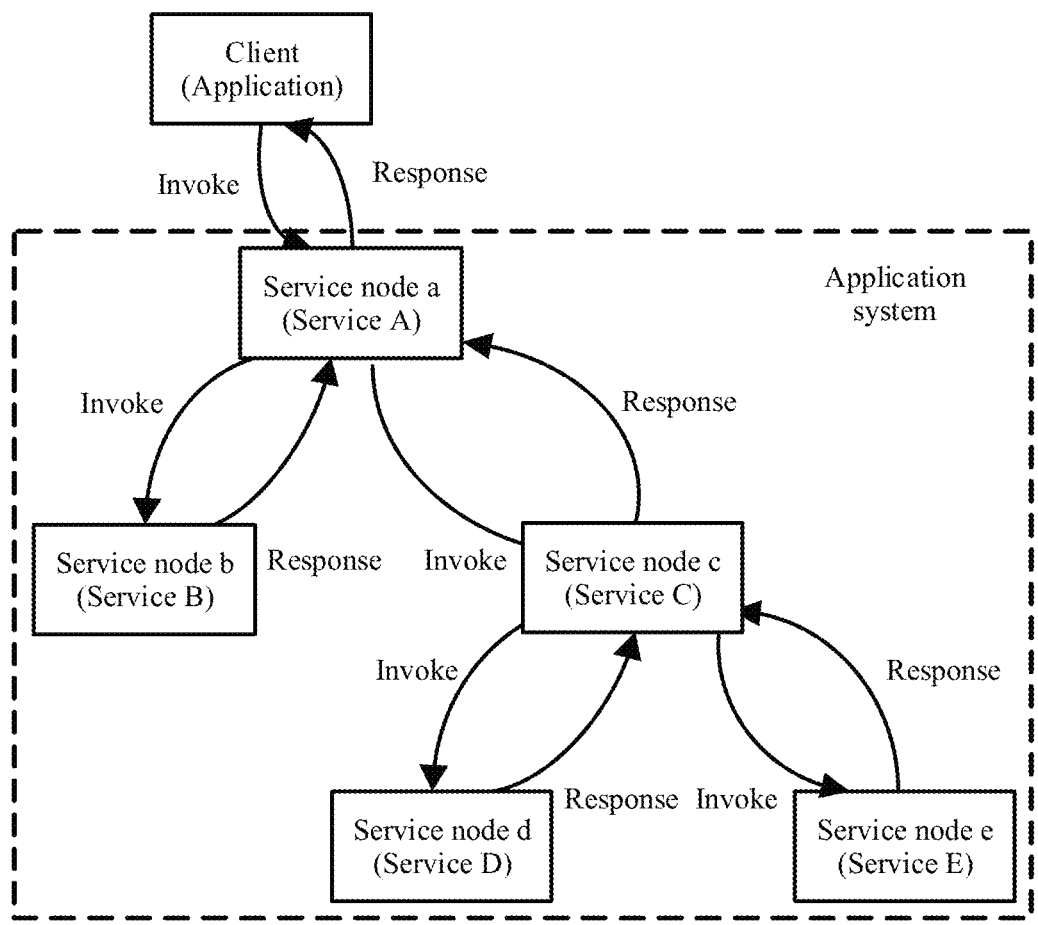
FIG. 3 is a schematic diagram of an application system corresponding to the invoking relationship shown in FIG. 2 according to this application.
Figure 4:
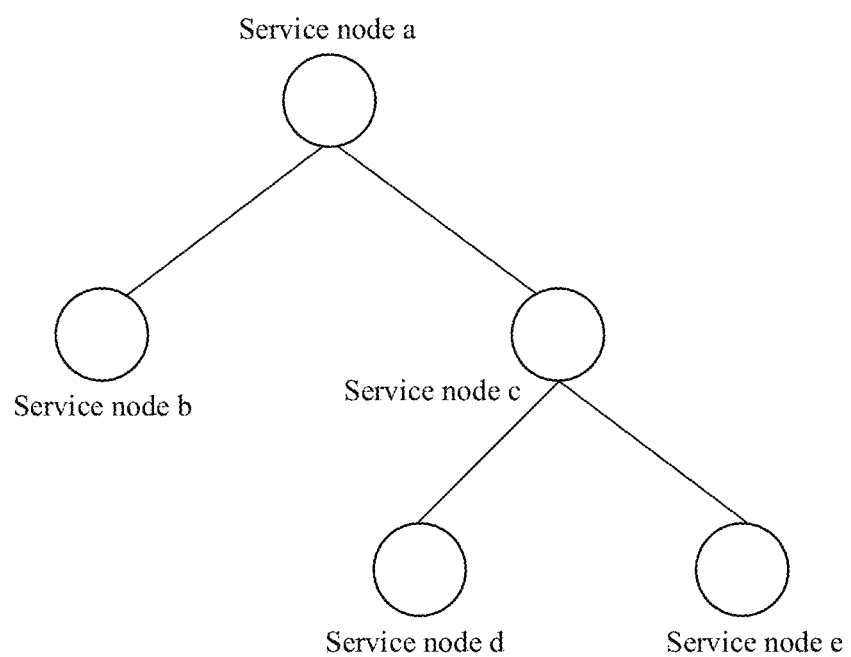
FIG. 4 is a schematic diagram of a trace chain corresponding to the application system shown in FIG. 3 according to this application.

An invoking relationship between the application system and a service node may be represented by using a trace chain. Each service node in the application system corresponds to one service node in the trace chain. An invoking relationship between service nodes in FIG. 3 may correspond to a connection line between service nodes in a trace chain in FIG. 4. The application system shown in FIG. 3 is used as an example. A trace chain corresponding to the application system may be shown in FIG. 4. A correspondence between FIG. 3 and FIG. 4 may be as follows: A service node a in FIG. 3 may correspond to a service node a in FIG. 4. A service node b in FIG. 3 may correspond to a service node b in FIG. 4. A service node c in FIG. 3 may correspond to a service node c in FIG. 4. A service node d in FIG. 3 may correspond to a service node d in FIG. 4. A service node e in FIG. 3 may correspond to a service node e in FIG. 4. An invoking relationship between the service node a and the service node b in FIG. 3 may correspond to a connection line between the service node a and the service node b in FIG. 4. An invoking relationship between the service node a and the service node c in FIG. 3 may correspond to a connection line between the service node a and the service node c in FIG. 4. An invoking relationship between the service node c and the service node d in FIG. 3 may correspond to a connection line between the service node c and the service node d in FIG. 4. An invoking relationship between the service node c and the service node e in FIG. 3 may correspond to a connection line between the service node c and the service node e in FIG. 4. It should be understood that the invoking relationship may also be represented by using an invoking relationship tree, an invoking relationship diagram, or the like. This should not constitute a specific limitation herein.

To facilitate tracing and locating a fault, each service node in the application system generates trace chain information. The trace chain information is used to record a trace chain field and an event field. The trace chain information may be carried in a trace chain log, or a packet sent by the application system to a trace chain server. This is not specifically limited herein.

The trace chain field includes a trace chain identifier (Trace ID), a span identifier (Span ID), and a parent node identifier (Parent ID). The trace chain identifier is a unique identifier of a trace chain. The span identifier is a unique identifier of a current service node. The parent node identifier is an identifier of a previous service node that invokes the current service node. The foregoing method for representing the trace chain field is merely used as an example. In another implementation, the trace chain field may also be represented in another manner. For example, the trace chain field may further include a child node identifier used to represent a next service node invoked by the current service node. This is not specifically limited herein.

The application system shown in FIG. 3 is used as an example. A trace chain identifier included in a trace chain field of the service node a is a trace ID 1. A span identifier included in the trace chain field of the service node a is an identifier of the service node a. There is no parent node identifier included in the trace chain field of the service node a. A trace chain identifier included in a trace chain field of a trace chain node of the service node b is a trace ID 1. A span identifier included in the trace chain field of the service node b is an identifier of the service b. A parent node identifier included in the trace chain field of the service node b is an identifier of the service node a. A trace chain identifier included in a trace chain field of the service node c is a trace ID 1. A span identifier included in the trace chain field of the service node c is an identifier of the service node c. A parent node identifier included in the trace chain field of the service node c is an identifier of the service node a. A trace chain identifier included in a trace chain field of the service node d is a trace ID 1. A span identifier included in the trace chain field of the service node d is an identifier of the service node d. A parent node identifier included in the trace chain field of the service node d is an identifier of the service node c. A trace chain identifier included in a trace chain field of the service node e is a trace ID 1. A span identifier included in the trace chain field of the service node e is an identifier of the service node e. A parent node identifier included in the trace chain field of the service node e is an identifier of the service node c.

The event field mainly includes a fault event. In addition, the event field may further include a time at which a current service node is invoked, a time at which the current service node returns a response, a protocol type, a protocol parameter, and the like. The protocol type may be a discovery and basic configuration protocol (DCP), a hypertext transfer protocol (HTTP), or the like. The protocol parameter may be a uniform resource locator (URL), a user name, request data content, or the like. It should be understood that the event field may further include less or more content. This is not specifically limited herein.

In a specific embodiment, a service node d is used as an example. Trace chain information generated by the service node d may be shown in Table 1.

TABLE 1

| Trace chain information | | | | | | | |
| --- | --- | --- | --- | --- | --- | --- | --- |
| Trace chain field | | | Event field | | | | |
| Trace chain identifier | Span identifier | Parent node identifier | Invoke time | Return a response | Fault event | Protocol type | Protocol parameter |
| Trace ID 1 | Span ID D | Parent ID c | Invoke time 1 | Return a response 1 | Function invoking fails | Protocol type 1 | Protocol parameter 1 |
| ... | ... | ... | ... | ... | ... | ... | ... |

It should be understood that trace chain information of other service nodes is similar to the trace chain information of the service node d, and is not listed one by one herein. In addition, the trace chain information shown in Table 1 is merely an example, and should not constitute a specific limitation.

Figure 5:
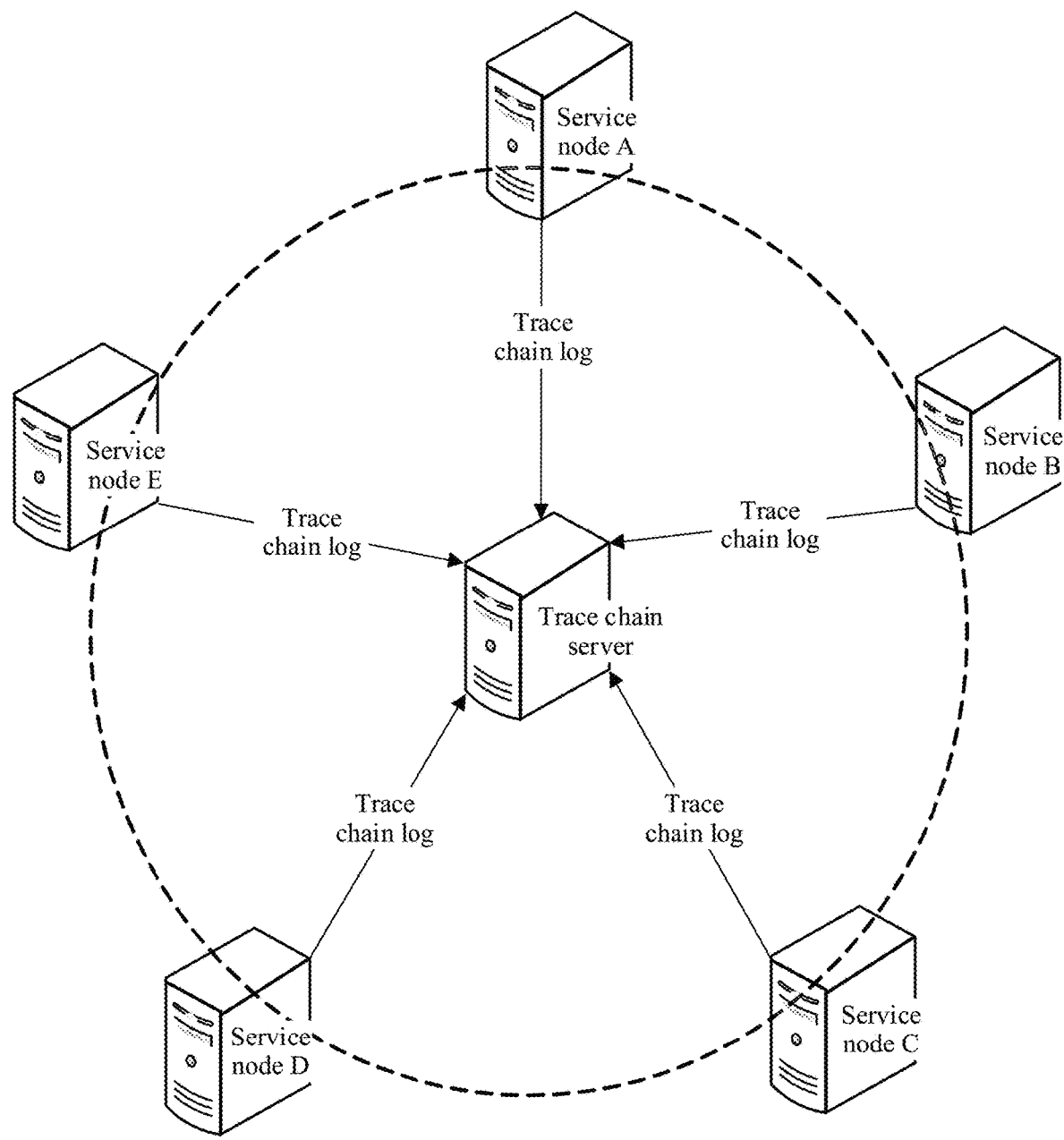
FIG. 5 is a schematic diagram of a transmission relationship between a service node corresponding to the application system shown in FIG. 3 and a trace chain server according to this application.

As shown in FIG. 5, each service node in an application system may send, to a trace chain server in a wired or wireless manner, trace chain information generated by the service node. Correspondingly, the trace chain server may receive, in a wired or wireless manner, the trace chain information generated by each service node in the application system.

The trace chain server restores a trace chain based on a trace chain field in the trace chain information of each service node, and traces and locates a fault based on the trace chain and event fields.

The application system shown in FIG. 3 is used as an example. Assuming that a fault occurs on the service node d, the trace chain server may locate, in the following manner, that the fault occurs on the service node d:

The trace chain server finds trace chain information of the service node a to the service node d based on a trace chain identifier trace ID 1.

The trace chain server restores a trace chain based on trace chain fields in the trace chain information of the service node a to the service node d. Specifically, the trace chain server determines, based on a parent node identifier in a trace chain field of the service node e, that a parent node of the service node e is the service node c. The trace chain server determines, based on a parent node identifier in a trace chain field of the service node d, that a parent node of the service node d is the service node c. The trace chain server determines, based on a parent node identifier in a trace chain field of the service node c, that a parent node of the service node c is the service node a. The trace chain server determines, based on a parent node identifier in a trace chain field of the service node b, that a parent node of the service node b is the service node a. The trace chain server determines, based on a parent node identifier in a trace chain field of the service node a, that the service node a is a root node. In this way, the trace chain server restores the trace chain shown in FIG. 4.

The trace chain server locates, based on the restored trace chain and event fields in the trace chain information of the service node a to the service node d, that the fault occurs on the service node d. Specifically, the trace chain server queries a fault event in an event field of the service node a along the trace chain to determine that there is no fault occurred on the service node a. The trace chain server queries a fault event in an event field of the service node b along the trace chain to determine that there is no fault occurred on the service node b. The trace chain server queries a fault field in an event field of the service node c along the trace chain to determine that there is no fault occurred on the service node c. The trace chain server queries a fault field in an event field of the service node d along the trace chain to determine that there is the fault occurred on the service node d. The trace chain server queries a fault field in an event field of the service node e along the trace chain to determine that there is no fault occurred on the service node e. In other words, the trace chain server traverses the trace chain to locate that the fault occurs on the service node d.

It is obvious that the trace chain server can trace and locate the fault only on service nodes using a same trace chain identifier, and has a relatively large limitation. In other words, the trace chain server can trace and locate the fault only in a single trace chain scenario.

Figure 6:
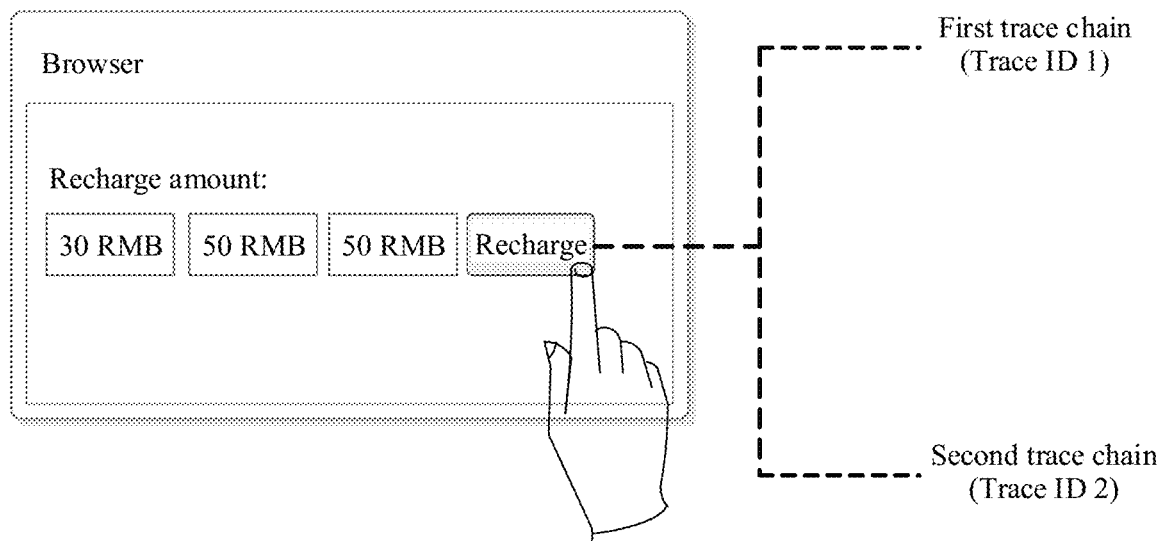
FIG. 6 is a schematic diagram of a recharge scenario according to an embodiment of this application.
Figure 7:
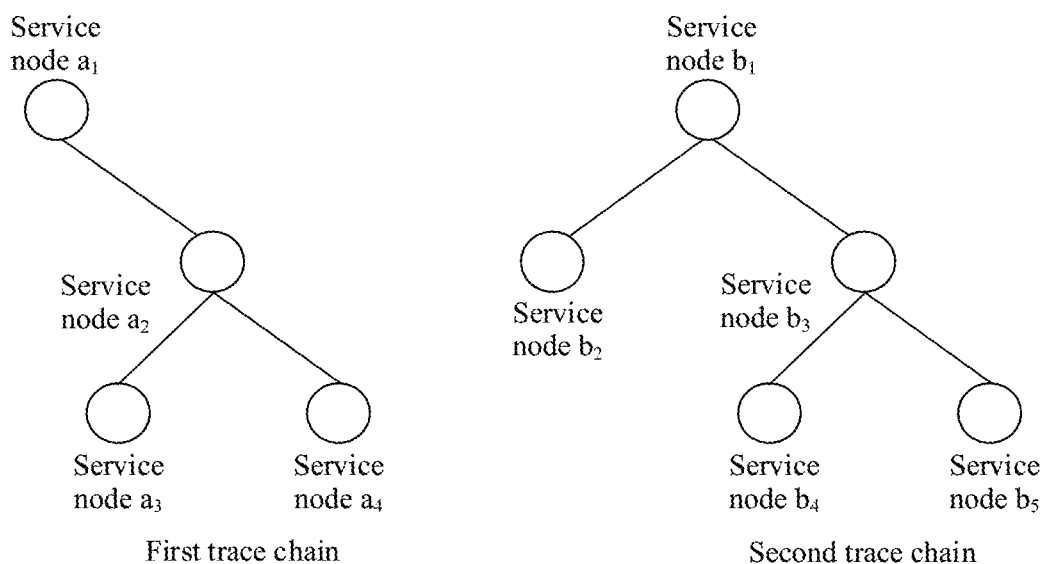
FIG. 7 is a schematic diagram of an invoking relationship between an application and a service in a multi-trace chain scenario according to an embodiment of this application.

The following describes in detail an application scenario in this application. FIG. 6 is a schematic diagram of a recharge application scenario in this application. As shown in FIG. 6, a user selects a to-be-recharged amount on the left side of a browser in the figure. Then, the user clicks a recharge button on the right side of the browser to implement recharge. If the user fails to recharge, a fault needs to be traced and located to determine a specific node where the fault occurs. As shown in FIG. 7, it is assumed that from a time when the user clicks the recharge button on a browser page to a time when the recharge is completed, an application system triggers and generates two trace chains in total. A first trace chain (as shown on the left in FIG. 7) is used for balance query. A second trace chain (as shown on the right in FIG. 7) is used for the recharge. In other words, a plurality of different trace chains are generated in the recharge application scenario. It is obvious that the trace chain server can trace and locate the fault only in the single trace chain scenario, but cannot trace and locate the fault in the multi-trace chain scenario shown in FIG. 6.

It should be understood that the recharge application scenario shown in FIG. 6 is merely an example. In another embodiment, there may be another application scenario, for example, an application scenario such as a payment application scenario in which a plurality of trace chains are simultaneously generated (referred to as the multi-trace chain scenario for short). This is not specifically limited herein.

To resolve a problem that the trace chain server can trace and locate the fault only in the single trace chain scenario, a group identifier needs to be added to a trace chain log generated by each service node in the application system. Specifically, each service node in the first trace chain in the application system generates first trace chain information. The first trace chain information is used to record a first trace chain field and a first event field.

The first trace chain field includes the group identifier, a first trace chain identifier (Trace ID 1), a span identifier (Span ID), and a parent node identifier (Parent ID). The group identifier is used to indicate a user operation (namely, an operation that the user clicks the recharge). The first trace chain identifier is a unique identifier of the trace chain. The span identifier is a unique identifier of a current service node. The parent node identifier is an identifier of a previous service node that invokes the current service node.

Each service node in the second trace chain in the application system generates second trace chain information. The second trace chain information is used to record a second trace chain field and a second event field. The second trace chain field includes the group identifier, a second trace chain identifier (Trace ID 2), a span identifier (Span ID), and a parent node identifier (Parent ID). The group identifier is used to indicate the user operation (namely, the operation that the user clicks the recharge). The second trace chain identifier is a unique identifier of the trace chain. The span identifier is a unique identifier of a current service node. The parent node identifier is an identifier of a previous service node that invokes the current service node.

Both the first event field in the trace chain information of the first trace chain and the second event field in the trace chain information of the second trace chain are the same as the event field in the foregoing trace chain information. This is not specifically limited herein.

In a specific embodiment, a service node $a_2$ is used as an example. First trace chain information generated by the service node $a_2$ may be shown in Table 2. A service node $b_3$ is used as an example. Second trace chain information generated by the service node $b_3$ may be shown in Table 3.

TABLE 2

| First trace chain information | | | | | | | | |
|---|---|---|---|---|---|---|---|---|
| Trace chain field | | | | Event field | | | | |
| Group identifier | Trace chain identifier | Span identifier | Parent node identifier | Invoke time | Return a response | Fault event | Protocol type | Protocol parameter |
| Group 1 | Trace ID 1 | Span ID $a_2$ | Parent ID $a_3$ | Invoke time 1 | Return a response 1 | Function invoking fails | Protocol type 1 | Protocol parameter 1 |
| ... | ... | ... | ... | ... | ... | ... | ... | ... |

TABLE 3

| Second trace chain information ||||||||| 
| Trace chain field |||| Event field |||||
| Group identifier | Trace chain identifier | Span identifier | Parent node identifier | Invoke time | Return a response | Fault event | Protocol type | Protocol parameter |
|---|---|---|---|---|---|---|---|---|
| Group 1 | Trace ID 2 | Span ID $b_3$ | Parent ID $b_1$ | Invoke time 2 | Return a response 2 | Function invoking succeeds | Protocol type 1 | Protocol parameter 1 |
| ... | ... | ... | ... | ... | ... | ... | ... | ... |

It should be understood that trace chain information of other service nodes in the first trace chain is similar to the trace chain information of the service node $a_2$. Trace chain information of other service node in the second trace chain is similar to the trace chain information of the service node $b_3$. Details are not listed herein.

Figure 8:
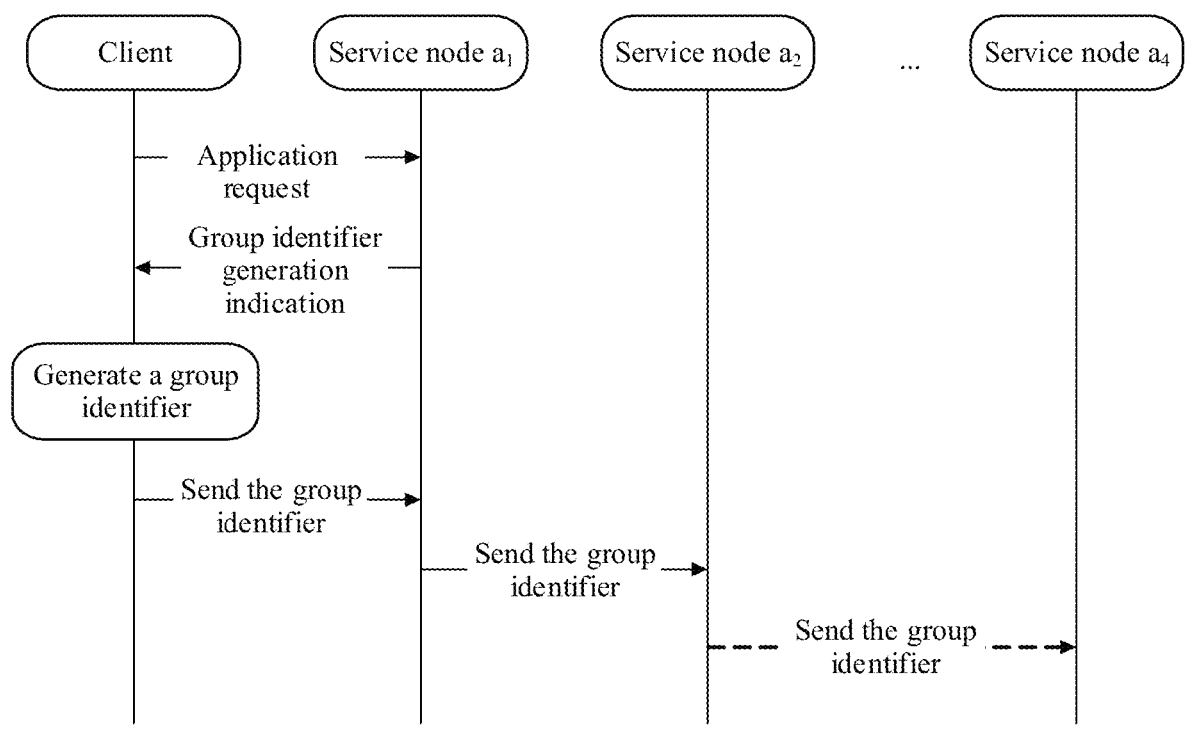
FIG. 8 is a schematic diagram of generating and transferring a group identifier according to an embodiment of this application.

In a specific embodiment, the group identifier may include an operation identifier, a user identifier, and a timestamp. The operation identifier is used to indicate an operation of the user. The operation of the user may include page loading, a control operation, or the like. As shown in FIG. 8, the application system shown in FIG. 7 is used as an example. A process of generating the group identifier may be as follows: When the user clicks the recharge button, the user sends an application request to the service node $a_1$ in the first trace chain by using a browser on a client. The application request includes an operation identifier, a user identifier, and a timestamp. After receiving the application request sent by the client, the service node $a_1$ generates a group identifier generation indication, and sends the group identifier generation indication to the client. After receiving the group identifier generation indication, the client generates the group identifier based on the operation identifier, the user identifier, and the timestamp, and sends the group identifier to the service node $a_1$. Then, the service node $a_1$ sequentially transfers the group identifier in a sequence of the service node $a_2$, the service node $a_3$, and the service node $a_4$. The browser on the client sends the group identifier to the service node $b_1$ in a second trace chain. Then, the service node $b_1$ sequentially transfers the group identifier in a sequence of the service node $b_2$, the service node $b_3$, the service node $b_4$, and the service node $b_5$.

In a specific embodiment, the operation identifier may use the following format: When an operation of the user is page loading, the operation identifier includes a first uniform resource locator URL. The first URL is a URL of a loaded page. When the operation of the user is the control operation, the operation identifier includes a second URL, a control name, and an operation type. The second URL is a URL of a page on which an operated control is located. The control name is a name of the operated control. The operation type is a type of an operation performed on the operated control. It should be understood that the format of the operation identifier is merely an example, and should not constitute a specific limitation.

Figure 9:
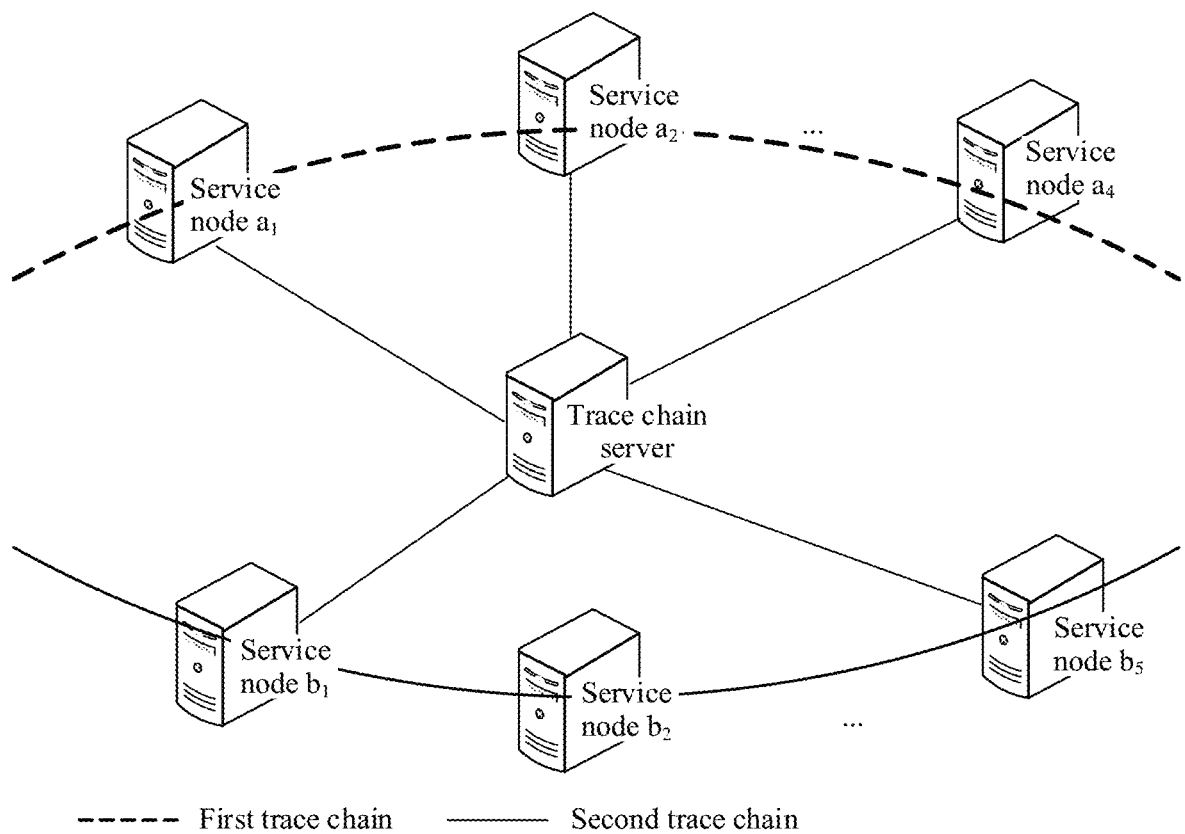
FIG. 9 is a schematic diagram of a transmission relationship between a service node corresponding to the application system shown in FIG. 7 and a trace chain server according to this application.

As shown in FIG. 9, each service node in an application system may send, to a trace chain server in a wired or wireless manner, trace chain information generated by the service node. Correspondingly, the trace chain server may receive, in a wired or wireless manner, the trace chain information generated by each service node in the application system.

The trace chain server finds trace chain information including a group identifier based on the group identifier, restores trace chains based on trace chain fields in the trace chain information, and traces and locates a fault based on the trace chains and event fields.

The application system shown in FIG. 7 is used as an example. Assuming that a fault occurs on the service node $a_2$, the trace chain server may locate, in the following manner, that the fault occurs on the service node $a_2$:

(1) The trace chain server finds trace chain information including a group identifier based on the group identifier. Specifically, the trace chain server finds trace chain information of the service node $a_1$ to the service node $a_4$ in the first trace chain, and trace chain information of the service node $b_1$ to the service node $b_5$ in the second trace chain.

(2) The trace chain server finds the trace chain information of the service node $a_1$ to the service node $a_4$ based on a trace chain identifier trace ID 1.

(3) The trace chain server restores the trace chain based on trace chain fields in the trace chain information of the service node $a_1$ to the service node $a_4$. Specifically, the trace chain server determines, based on a parent node identifier in a trace chain field of the service node $a_4$, that a parent node of the service node $a_4$ is the service node $a_2$. The trace chain server determines, based on a parent node identifier in a trace chain field of the service node $a_3$, that a parent node of the service node $a_3$ is the service node $a_2$. The trace chain server determines, based on a parent node identifier in a trace chain field of the service node $a_2$, that a parent node of the service node $a_2$ is the service node $a_1$. The trace chain server determines, based on a parent node identifier in a trace chain field of the service node $a_1$, that the service node $a_1$ is a root node. In this way, the trace chain server restores the first trace chain shown on the left in FIG. 7.

(4) The trace chain server finds the trace chain information of the service node $b_1$ to the service node $b_5$ based on a trace chain identifier trace ID 2.

(5) The trace chain server restores the second trace chain based on trace chain fields in the trace chain information of the service node $b_1$ to the service node $b_5$. Specifically, the trace chain server determines, based on a parent node identifier in a trace chain field of the service node $b_5$, that a parent node of the service node $b_5$ is the service node $b_3$. The trace chain server determines, based on a parent node identifier in a trace chain field of the service node $b_4$, that a parent node of the service node $b_4$ is the service node $b_3$. The trace chain server determines, based on a parent node identifier in a trace chain field of the service node $b_3$, that a parent node of the service node $b_3$ is the service node $b_1$. The trace chain server determines, based on a parent node identifier in a trace chain field of the service node $b_2$, that a parent node of the service node $b_2$ is the service node $b_1$. The trace chain server determines, based on a parent node identifier in a trace chain field of the service node $b_1$, that the service node $b_1$ is a root node. In this way, the trace chain server restores the second trace chain shown on the right in FIG. 7.

(6) The trace chain server separately traverses the first trace chain and the second trace chain to determine that the fault occurs on the service node $a_2$. Specifically, the trace chain server queries a fault event in an event field of the service node $a_1$ along the first trace chain to determine that there is no fault occurred on the service node $a_1$. The trace chain server queries a fault event in an event field of the service node $a_2$ along the first trace chain to determine that there is the fault occurred on the service node $a_2$. The trace chain server queries a fault event in an event field of the service node $a_3$ along the first trace chain to determine that there is no fault occurred on the service node $a_3$. The trace chain server queries a fault event in an event field of the service node $a_4$ along the first trace chain to determine that there is no fault occurred on the service node $a_4$. Then, the trace chain server queries a fault event in an event field of the service node $b_1$ along the second trace chain to determine that there is no fault occurred on the service node $b_1$. The trace chain server queries a fault event in an event field of the service node $b_2$ to determine that there is no fault occurred on the service node $b_2$. The trace chain server queries a fault event in an event field of the service node $b_3$ along the second trace chain to determine that there is no fault occurred on the service node $b_3$. The trace chain server queries a fault event in an event field of the service node $b_4$ along the second trace chain to determine that there is no fault on the service node $b_4$. The trace chain server queries a fault event in an event field of the service node $b_5$ along the second trace chain to determine that there is no fault occurred on the service node $b_5$. In other words, the trace chain server traverses the first trace chain and the second trace chain to locate the fault occurred on the service node $a_2$.

It should be understood that the solution in which the trace chain server traces and locates the fault based on the group identifier is merely an example. In another possible embodiment, the trace chain server may trace and locate the fault based on the group identifier in another manner. This is not specifically limited herein.

To facilitate observation for a user, the user can enter a search criteria on a browser to search for trace chain information that meets the search criteria.

Figure 10:
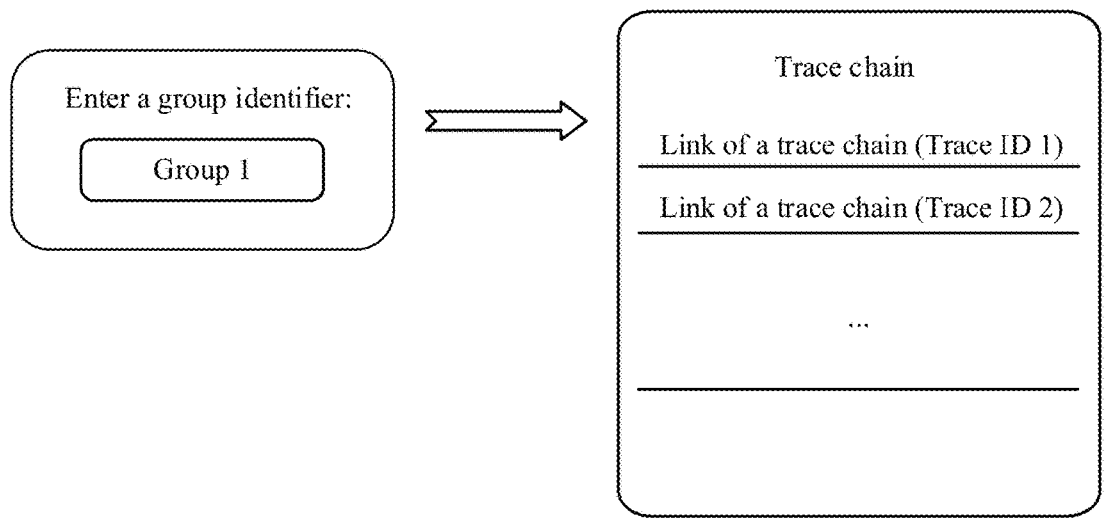
FIG. 10 is a schematic diagram of a relationship in which corresponding trace chain information is found based on a group identifier according to this application.
Figure 11:
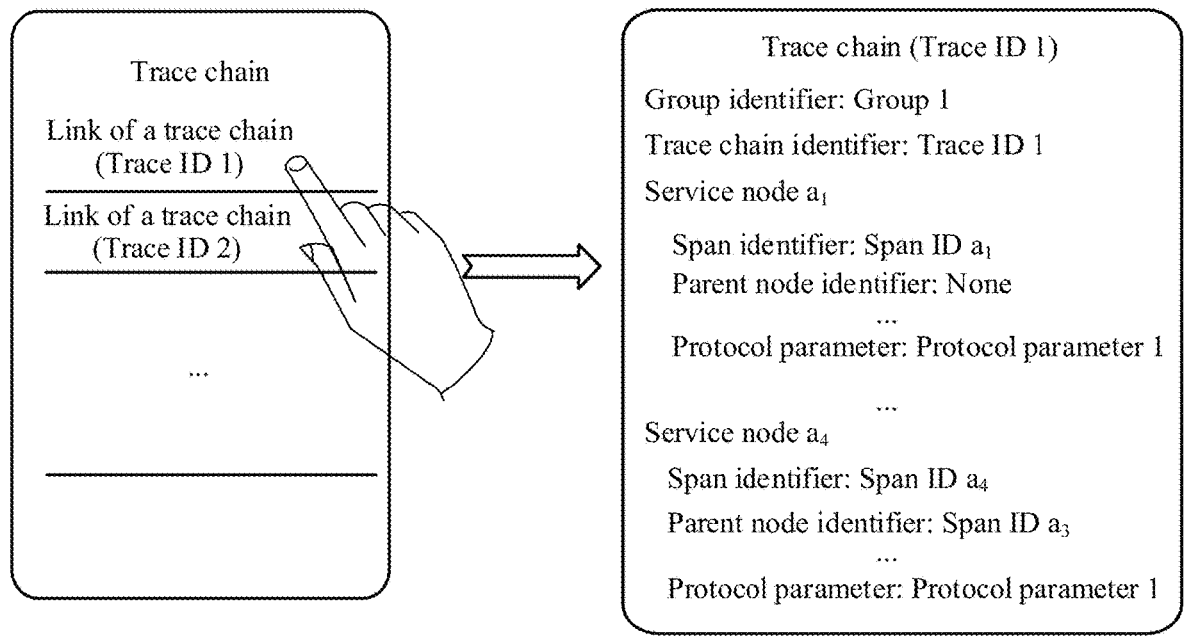
FIG. 11 is a schematic diagram of displaying trace chain information when a link of a trace chain is clicked according to this application.

In a first manner, the user may enter a group identifier on the browser to find trace chain information including the group identifier. As shown in FIG. 10, a browser first displays an input box on the left in FIG. 10. After a user enters a group identifier in the input box, the browser displays a display box on the right in FIG. 10. The display box displays a link of a trace chain including the group identifier entered by the user. Herein, the trace chain including the group identifier entered by the user includes trace chain information of a trace chain whose trace chain identifier is a trace ID 1 and trace chain information of a trace chain whose trace chain identifier is a trace ID 2. It should be understood that the group identifier may further be obtained in another manner. For example, a user operation may be detected by using a browser plug-in to obtain an operation identifier corresponding to the user operation. Still as shown in FIG. 11, when a link (as shown on the left in FIG. 11) of a trace chain whose trace chain identifier is a trace ID 1, displayed on a browser is clicked, the browser displays trace chain information (as shown on the right in FIG. 11) of the trace chain whose trace chain identifier is the trace ID 1. For example, the browser displays a group identifier, a trace chain identifier, a span identifier, a parent node identifier, an event field, and the like of each service node.

Figure 12:
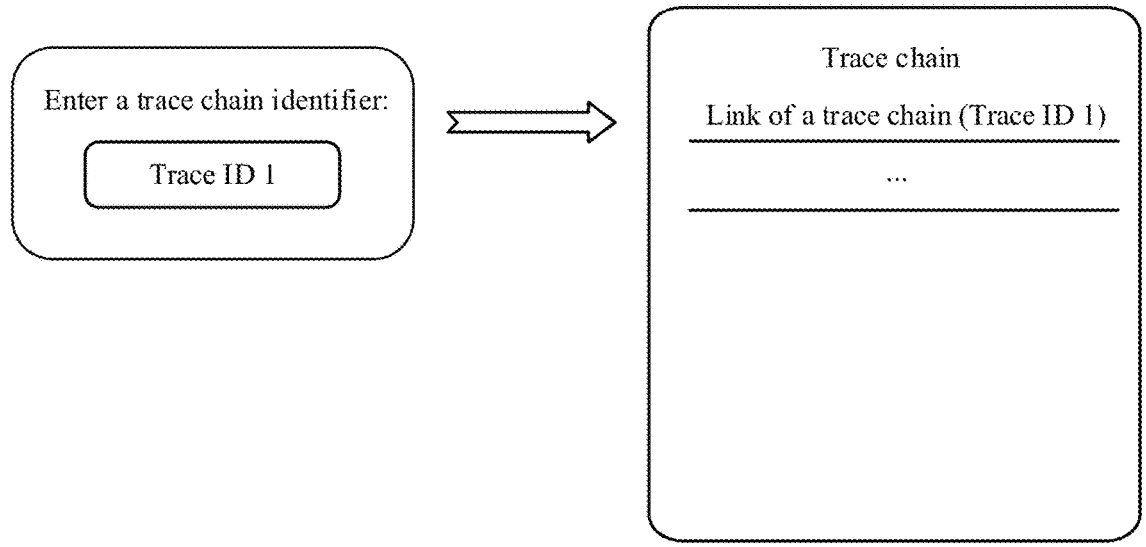
FIG. 12 is a schematic diagram of a relationship in which corresponding trace chain information is found based on an identifier of a trace chain according to this application.
Figure 13:
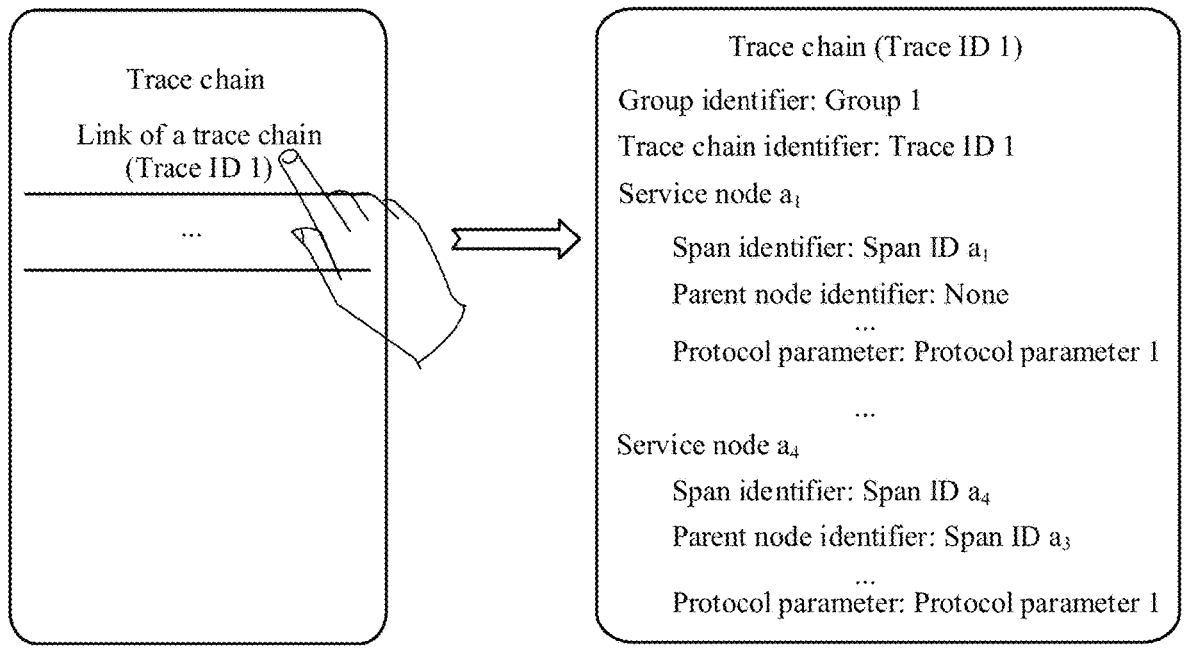
FIG. 13 is a schematic diagram of displaying trace chain information when a link of a trace chain is clicked according to this application.

In a second manner, the user may enter a trace chain identifier in the browser to find trace chain information including the trace chain identifier. As shown in FIG. 12, a browser first displays an input box on the left in FIG. 12. After a user enters a trace chain identifier in the input box, the browser displays a display box on the right in FIG. 12. The display box displays a link of a trace chain including the trace chain identifier (a trace ID 1) entered by the user. Herein, the trace chain including the trace chain identifier entered by the user includes a trace chain whose trace chain identifier is the trace ID 1. It should be understood that the trace chain identifier may further be obtained in another manner. For example, a user operation may be detected by using a browser plug-in to obtain one or more trace chain identifiers corresponding to the user operation. Still as shown in FIG. 13, when a link (as shown on the left in FIG. 13) of a trace chain including a trace chain identifier (a trace ID 1) entered by a user is clicked, the browser displays corresponding trace chain information (as shown on the right in FIG. 13). For example, the browser displays a group identifier, a trace chain identifier, a span identifier, a parent node identifier, an event field, and the like of each service node.

Figure 14:
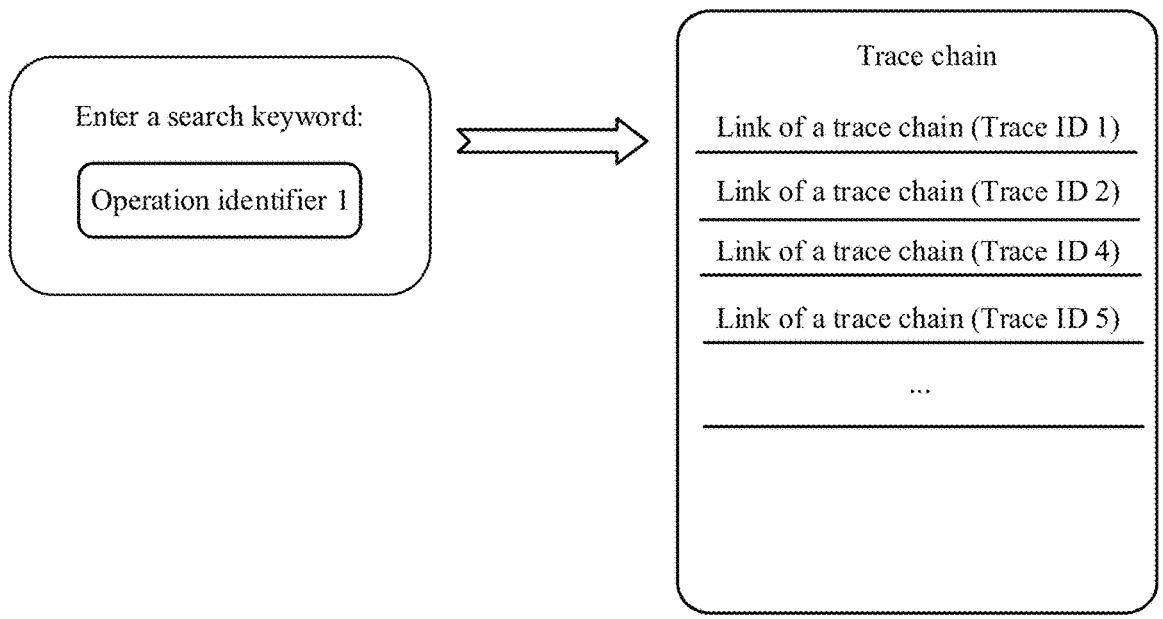
FIG. 14 is a schematic diagram of a relationship in which corresponding trace chain information is found based on a search keyword according to this application.
Figure 15:
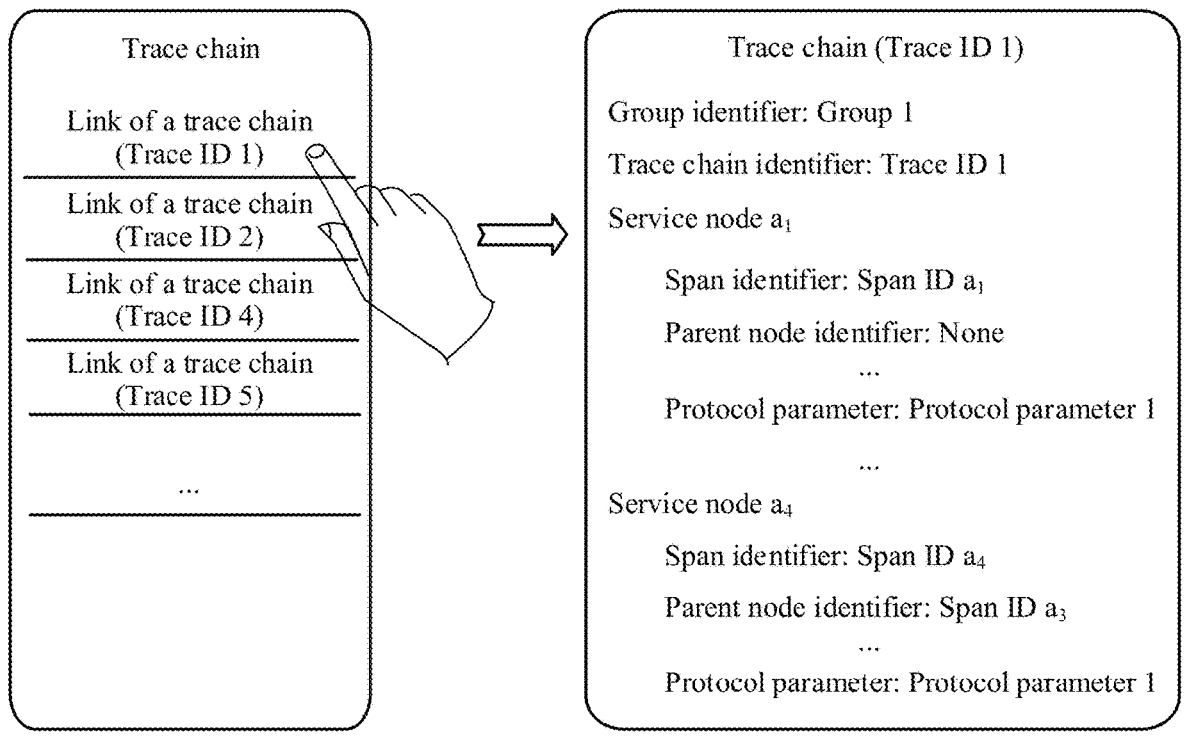
FIG. 15 is a schematic diagram of displaying trace chain information when a link of a trace chain is clicked according to this application.

In a third manner, the user may enter a search keyword on a browser to find trace chain information including the search keyword. The search keyword includes one or more of the operation identifier, the user identifier, and the timestamp. As shown in FIG. 14, a browser first displays an input box on the left in FIG. 14. After a user enters an operation identifier in the input box, the browser displays a display box on the right in FIG. 14. The display box displays a link of a trace chain including the operation identifier entered by the user. Herein, trace chain logs including search keywords entered by the user include trace chains whose trace chain identifiers are a trace ID 1 and a trace ID 2, and trace chains whose trace chain identifiers are a trace ID 4 and a trace ID 5. Still as shown in FIG. 15, when a link (as shown on the left in FIG. 15) of a trace chain including a search keyword, displayed on a browser is clicked, the browser displays corresponding trace chain information (as shown on the right in FIG. 15). For example, the browser displays a group identifier, a trace chain identifier, a span identifier, a parent node identifier, event information, and the like of each service node.

It should be understood that the three trace chain information display manners are merely examples, and should not constitute a specific limitation.

Figure 16:
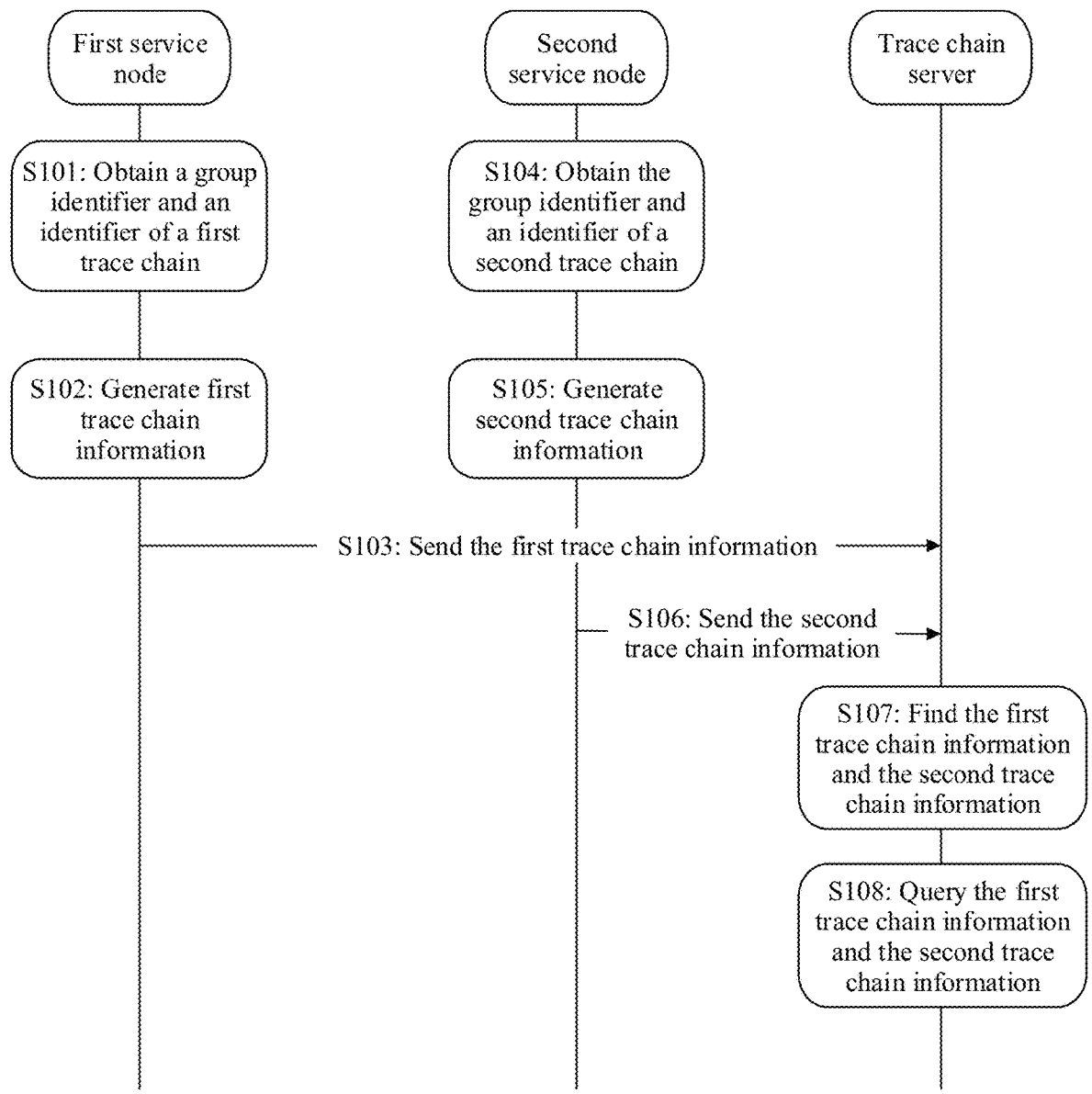
FIG. 16 is a flowchart of interaction of a trace chain information query method according to this application.

FIG. 16 is a flowchart of interaction of a trace chain information query method according to this application. The trace chain information query method in this application includes the following steps.

S101: A first service node obtains a group identifier and an identifier of a first trace chain, where the first service node is a service node in the first trace chain, the first trace chain is generated as triggered by a user operation, the group identifier is used to indicate an operation of the user, and the first trace chain identifier is an identifier of the first trace chain.

S102: The first service node generates first trace chain information, where the first trace chain information includes the group identifier and the identifier of the first trace chain.

S103: The first service node sends the first trace chain information to a trace chain server. Correspondingly, the trace chain server receives the first trace chain information sent by the first service node.

S104: A second service node obtains the group identifier and an identifier of a second trace chain, where the second service node is a service node in the second trace chain, the second trace chain is generated as triggered by the user operation, the group identifier is used to indicate an operation of the user, and the second trace chain identifier is an identifier of the second trace chain.

S105: The second service node generates second trace chain information, where the second trace chain information includes the group identifier and the identifier of the second trace chain.

S106: The second service node sends the second trace chain information to the trace chain server. Correspondingly, the trace chain server receives the second trace chain information sent by the second service node.

S107: The trace chain server obtains the group identifier, and finds the first trace chain information and the second trace chain information based on the group identifier.

S108: The trace chain server separately queries the first trace chain information and the second trace chain information to locate a fault in an application generated by the user operation.

In the embodiment, the trace chain server may be the trace chain server in FIG. 9. The first service node may be any one of the service node $a_1$ to the service node $a_4$ in FIG. 9. The second service node may be any one of the service node $b_1$ to the service node $b_5$ in FIG. 9. This is not specifically limited herein. For a specific working process and a principle of the trace chain server, refer to FIG. 9 to FIG. 15 and related descriptions of the trace chain server. For a specific working process and a principle of the first service node, refer to FIG. 9 to FIG. 15 and related descriptions of any one of the service node $a_1$ to the service node $a_4$. For a specific working process and a principle of the second service node, refer to FIG. 9 to FIG. 15 and related descriptions of any one of the service node $b_1$ to the service node $b_5$. Details are not described herein again.

It should be understood that a sequence of the step S101 to the step S103 and the step S104 to the step S106 is not limited. In another embodiment, the step S104 to the step S106 may be performed first, and then the step S101 to the step S103 are performed. This is not specifically limited herein.

Figure 17:
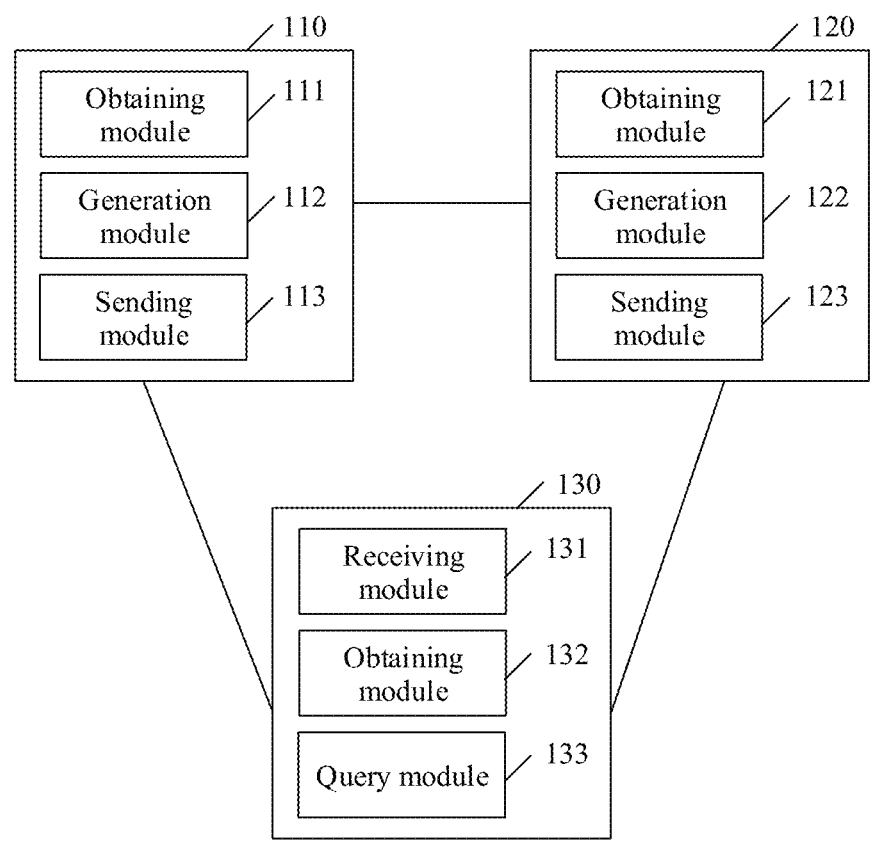
FIG. 17 is a schematic diagram of a structure of a trace chain information query system according to this application.

FIG. 17 is a schematic diagram of a structure of a trace chain information query system according to this application. As shown in FIG. 17, the trace chain information query system in this application includes a first service node 110, a second service node 120, and a trace chain server 130. The trace chain server 130 may be separately connected to the first service node 110 and the second service node 120 in a wired or wireless manner. The first service node 110 may be connected to the second service node 120 in a wired or wireless manner. The first service node 110 may generate first trace chain information, and send the first trace chain information to the trace chain server 130. The second service node 120 may generate second trace chain information, and send the second trace chain information to the trace chain server 130.

The first service node 110 may include an obtaining module 111, a generation module 112, and a sending module 113. The obtaining module 111 is configured to perform the step S101 in the method shown in FIG. 16. The generation module 112 is configured to perform the step S102 in the method shown in FIG. 16. The sending module 113 is configured to perform the step S103 in the method shown in FIG. 16.

The second service node 120 may include an obtaining module 121, a generation module 122, and a sending module 123. The obtaining module 121 is configured to perform the step S104 in the method shown in FIG. 16. The generation module 122 is configured to perform the step S105 in the method shown in FIG. 16. The sending module 123 is configured to perform the step S106 in the method shown in FIG. 16.

The trace chain server 130 may include a receiving module 131, an obtaining module 132, and a query module 133. The receiving module 131 is configured to perform operations that are performed by the trace chain server in the step S103 and the step S106 of the method shown in FIG. 16. The obtaining module 132 is configured to perform the step S107 in the method shown in FIG. 16. The query module 133 is configured to perform the step S108 in the method shown in

FIG. 16.

For brevity, functions of the foregoing service nodes and modules are not described in detail. For specific details, refer to FIG. 9 to FIG. 16 and related descriptions.

Figure 18:
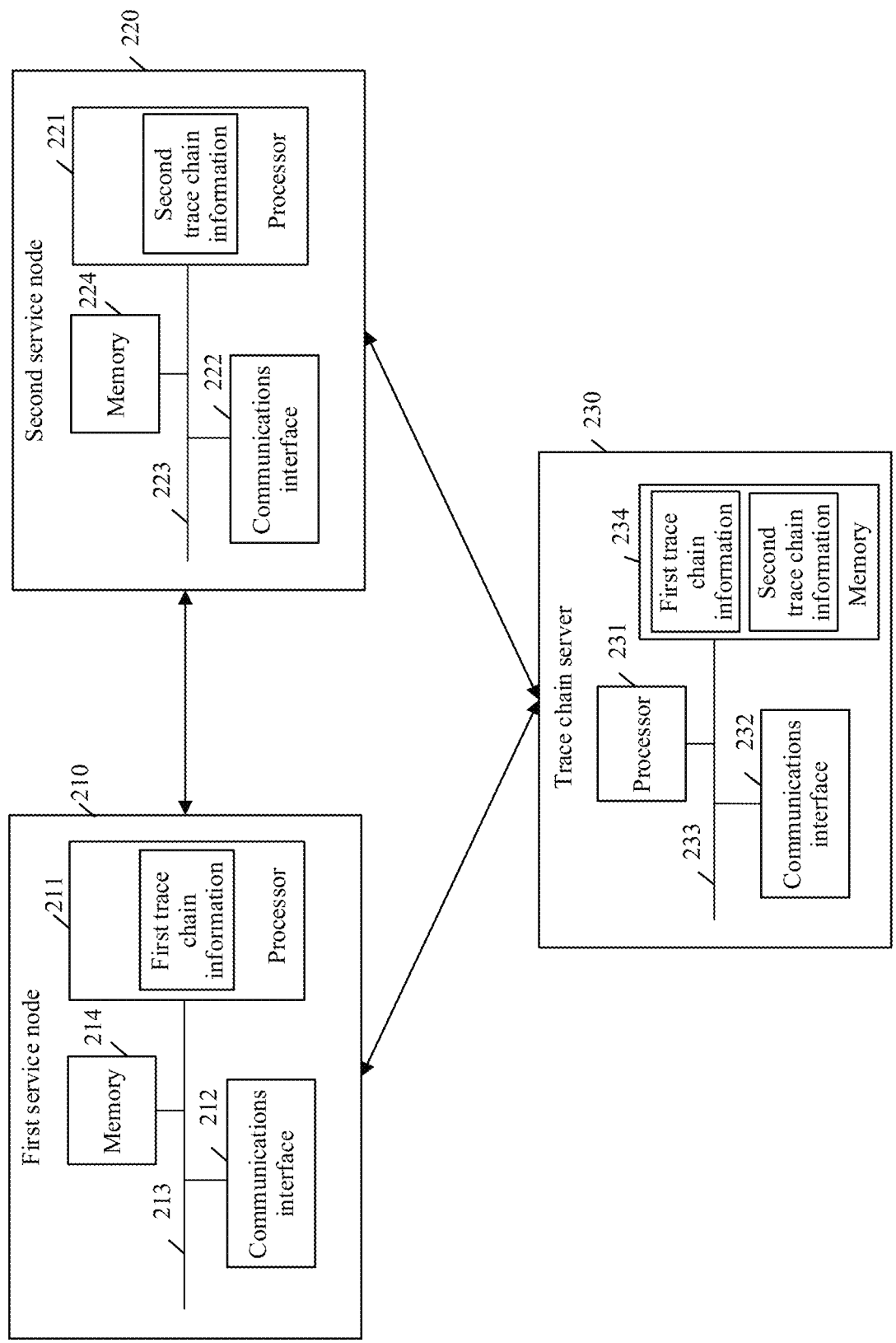
FIG. 18 is a schematic diagram of a structure of another trace chain information query system according to this application.

FIG. 18 is a schematic diagram of a structure of another trace chain information query system according to an embodiment of this application. As shown in FIG. 18, the trace chain information query system in this application includes one or more first service nodes 210, one or more second service nodes 220, and one or more trace chain servers 230. The trace chain server 230 may be separately connected to the first service node 210 and the second service node 220 in a wired or wireless manner. The first service node 210 may be connected to the second service node 220 in a wired or wireless manner. The first service node 210 may generate first trace chain information, and send the first trace chain information to the trace chain server 230. The second service node 220 may generate second trace chain information, and send the second trace chain information to the trace chain server 230.

As shown in FIG. 18, the first service node 210 includes one or more processors 211, communications interfaces 212, and memories 214. The processor 211, the communications interface 212, and the memory 214 may be connected through a bus 213.

The processor 211 includes one or more general purpose processors. The general purpose processor may be any type of device that can process an electronic instruction. The general purpose processor includes a CPU, a microprocessor, a microcontroller, a main processor, a controller, an ASIC, or the like. The processor 211 can be a dedicated processor used only for the first service node or can be shared with the second service node or the trace chain server. The processor 211 executes various types of digital storage instructions, for example, software or firmware instructions stored in the memory 214, so that the first service node provides relatively wide range of services. For example, the processor 211 can execute a program or process data, to execute at least a part of the method discussed in this specification.

The communications interface 212 may be a wired interface (for example, an Ethernet interface) or a wireless interface (for example, a cellular network interface or a wireless local area network interface), and is configured to communicate with another compute device or user. When the communications interface 212 is the wired interface, the communications interface 222 may use a TCP/IP protocol suite, such as, an RAAS protocol, an RFC protocol, a SOAP protocol, an SNMP protocol, a CORBA protocol, and a distributed protocol. When the communications interface 222 is the wireless interface, cellular communication may be used according to a GSM or CDMA standard. Therefore, the communications interface 222 includes a wireless modem, an electronic processing device, one or more digital memory devices, and a dual antenna that are used for data transmission. It should be understood that the modem can be implemented by software stored in a first service node and executed by the processor 211, or the modem can be a separate hardware component located inside or outside a first service node. The modem can operate with any quantity of different standards or protocols.

The memory 214 may include a volatile memory, for example, a RAM. The memory may further include a non-volatile memory, for example, a ROM, a flash memory, an HDD, or an SSD. Alternatively, the memory may include a combination of the foregoing types of memories. The memory 214 may be configured to store first trace information generated by the processor 211.

As shown in FIG. 18, the second service node 220 includes one or more processors 221, communications interfaces 222, and memories 224. The processor 221, the communications interface 222, and the memory 224 may be connected through a bus 223.

The processor 221 includes one or more general purpose processors. The general purpose processor may be any type of device that can process an electronic instruction. The general purpose processor includes a CPU, a microprocessor, a microcontroller, a main processor, a controller, an ASIC, or the like. The processor 221 can be a dedicated processor used only for the first service node or can be shared with the second service node or the trace chain server. The processor 221 executes various types of digital storage instructions, for example, software or firmware instructions stored in the memory 224, so that the first service node provides relatively wide range of services. For example, the processor 221 can execute a program or process data, to execute at least a part of the method discussed in this specification.

The communications interface 222 may be a wired interface (for example, an Ethernet interface) or a wireless interface (for example, a cellular network interface or a wireless local area network interface), and is configured to communicate with another compute device or user. When the communications interface 222 is the wired interface, the communications interface 222 may use a TCP/IP protocol suite, such as, an RAAS protocol, an RFC protocol, a SOAP protocol, an SNMP protocol, a CORBA protocol, and a distributed protocol. When the communications interface 222 is the wireless interface, cellular communication may be used according to a GSM or CDMA standard. Therefore, the communications interface 222 includes a wireless modem, an electronic processing device, one or more digital memory devices, and a dual antenna that are used for data transmission. It should be understood that the modem can be implemented by software stored in a first service node and executed by the processor 221, or the modem can be a separate hardware component located inside or outside a first service node. The modem can operate with any quantity of different standards or protocols.

The memory 224 may include a volatile memory, for example, a RAM. The memory may further include a non-volatile memory, for example, a ROM, a flash memory, an HDD, or an SSD. Alternatively, the memory may include a combination of the foregoing types of memories. The memory 224 may be configured to store first trace information generated by the processor 221.

As shown in FIG. 18, the trace chain server 230 includes one or more processors 231, communications interfaces 232, and memories 234. The processor 231, the communications interface 232, and the memory 234 may be connected through a bus 233. The trace chain server 230 may be implemented by using one or more compute nodes. The plurality of compute nodes cooperate to complete a function of the trace chain server 230.

The processor 231 includes one or more general purpose processors. The general purpose processor may be any type of device that can process an electronic instruction. The general purpose processor includes a central processing unit (CPU), a microprocessor, a microcontroller, a main processor, a controller, an application-specific integrated circuit (ASIC), or the like. The processor 231 can be a dedicated processor used only for the trace chain server or can be shared with another server or service node. The processor 231 executes various types of digital storage instructions, for example, software or firmware instructions stored in the memory 234, so that the trace chain server 230 provides relatively wide range of services. For example, the processor 231 can execute a program or process data, to execute at least a part of the method discussed in this specification.

The communications interface 232 may be a wired interface (for example, an Ethernet interface) or a wireless interface (for example, a cellular network interface or a wireless local area network interface), and is configured to communicate with another compute device or user.

The memory 234 may include a volatile memory, such as a random access memory (RAM). The memory may further include a non-volatile memory, such as a read-only memory (ROM), a flash memory, a hard disk drive (HDD), or a solid-state drive (SSD). Alternatively, the memory may include a combination of the foregoing types of memories. The memory 234 may use centralized storage, or may use distributed storage. This is not specifically limited herein. In a specific embodiment of this application, the memory 234 stores the first trace chain information sent by the first service node, the second trace chain information sent by the second service node, and the like. In addition, the memory 234 may further store other information, for example, security information and system information.

In the foregoing system, the trace chain server may be the trace chain server in FIG. 9. The first service node may be any one of the service node $a_1$ to the service node $a_4$ in FIG. 9. The second service node may be any one of the service node $b_1$ to the service node $b_5$ in FIG. 9. This is not specifically limited herein. For a specific working process and a principle of the trace chain server, refer to FIG. 9 to FIG. 16 and related descriptions of the trace chain server. For a specific working process and a principle of the first service node, refer to FIG. 9 to FIG. 16 and related descriptions of any one of the service node $a_1$ to the service node $a_4$. For a specific working process and a principle of the second service node, refer to FIG. 9 to FIG. 16 and related descriptions of any one of the service node $b_1$ to the service node $b_5$. Details are not described herein again.

In the solution, the application system associates trace chain information of different trace chains by using the group identifier. Therefore, the trace chain server may find, by using the group identifier, trace chain information including the group identifier, and query the trace chain information in a complex trace chain scenario.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a storage disk, or a magnetic tape), an optical medium (for example, a DVD), a semiconductor medium (for example, a solid-state storage drive (SSD)), or the like.

What is claimed is:

1. A trace chain information query method, comprising:
receiving, by a trace chain server, first trace chain information sent by a first service node and second trace chain information sent by a second service node, wherein the first service node is a service node in a first trace chain for a first set of service nodes associated with a user operation, the second service node is a service node in a second trace chain for a second set of service nodes associated with the user operation, both the first trace chain and the second trace chain are generated as triggered by the user operation, the first trace chain information includes a group identifier, and the second trace chain information includes the group identifier, the group identifier identifying the user operation common to the first trace chain and the second trace chain; and
obtaining, by the trace chain server, the group identifier, and finding the first trace chain information and the second trace chain information based on the group identifier.

2. The method according to claim 1, wherein the method further comprises:
the first trace chain information further comprises an identifier of the first trace chain, and the trace chain server finds the first trace chain information based on the identifier of the first trace chain; or
the second trace chain information further comprises an identifier of the second trace chain, and the trace chain server finds the second trace chain information based on the identifier of the second trace chain.

3. The method according to claim 1, wherein the group identifier comprises any one or more of an operation identifier, a user identifier, and a timestamp, the operation identifier is used to indicate an operation of the user, the user identifier is used to indicate an identity of the user, and the timestamp is used to indicate a time point at which the user performs the operation; and
the method further comprises:
searching, by the trace chain server based on a search keyword, trace chain information comprising the search keyword, wherein the search keyword comprises any one or more of the operation identifier, the user identifier, and the timestamp.

4. The method according to claim 3, wherein the operation of the user is page loading or a control operation, and
when the operation of the user is the page loading, the operation identifier comprises a first uniform resource locator (URL), wherein the first URL is a URL of a loaded page; or
when the operation of the user is the control operation, the operation identifier comprises a second URL, a control name, and an operation type, wherein the second URL is a URL of a page on which an operated control is located, the control name is a name of the operated control, and the operation type is a type of an operation performed on the operated control.

5. A trace chain information generation method, comprising:
obtaining, by a first service node, a group identifier and an identifier of a first trace chain, wherein the first service node is a service node in the first trace chain, and the first trace chain is generated as triggered by a user operation, and
generating, by the first service node, first trace chain information, wherein the first trace chain information includes the group identifier and the identifier of the first trace chain; and
obtaining, by a second service node, the group identifier and an identifier of a second trace chain, wherein the second service node is a service node in the second trace chain, and the second trace chain is generated as triggered by the user operation, and
generating, by the second service node, second trace chain information, wherein the second trace chain information includes the group identifier and the identifier of the second trace chain, wherein the group identifier identifies the user operation common to the first trace chain and the second trace chain.

6. The method according to claim 5, wherein the group identifier comprises any one or more of an operation identifier, a user identifier, and a timestamp, the operation identifier is used to indicate an operation of the user, the user identifier is used to indicate an identity of the user, and the timestamp is used to indicate a time point at which the user performs the operation; and the method further comprises:
inputting a search keyword, wherein the search keyword comprises one or more of the operation identifier, the user identifier, and the timestamp; and
displaying trace chain information comprising the search keyword.

7. The method according to claim 5, wherein the operation of the user is page loading or a control operation, and
when the operation of the user is the page loading, the operation identifier comprises a first URL, wherein the first URL is a URL of a loaded page; or
when the operation of the user is the control operation, the operation identifier comprises a second URL, a control name, and an operation type, wherein the second URL is a URL of a page on which an operated control is located, the control name is a name of the operated control, and the operation type is a type of an operation performed on the operated control.

8. A trace chain server, comprising a receiving module and an obtaining module, wherein
the receiving module is configured to receive first trace chain information sent by a first service node and second trace chain information sent by a second service node, wherein the first service node is a service node in a first trace chain associated with a user operation, the second service node is a service node in a second trace chain associated with the user operation, both the first trace chain and the second trace chain are generated as triggered by the user operation, the first trace chain information includes a group identifier, and the second trace chain information includes the group identifier, the group identifier identifying the user operation common to the first trace chain and the second trace chain; and the obtaining module is configured to obtain the group identifier, and find the first trace chain information and the second trace chain information based on the group identifier.

9. The server according to claim 8, wherein the server further comprises a query module, and the first trace chain information further comprises an identifier of the first trace chain, and the query module is further configured to find the first trace chain information based on the identifier of the first trace chain; or the second trace chain information further comprises an identifier of the second trace chain, and the query module is further configured to find the second trace chain information based on the identifier of the second trace chain.

10. The server according to claim 8, wherein the group identifier comprises any one or more of an operation identifier, a user identifier, and a timestamp, the operation identifier is used to indicate an operation of the user, the user identifier is used to indicate an identity of the user, and the timestamp is used to indicate a time point at which the user performs the operation; and the query module is further configured to search based on a search keyword, trace chain information comprising the search keyword, wherein the search keyword comprises any one or more of the operation identifier, the user identifier, and the timestamp.

11. The server according to claim 10, wherein the operation of the user is page loading or a control operation, and when the operation of the user is the page loading, the operation identifier comprises a first URL, wherein the first URL is a URL of a loaded page; or when the operation of the user is the control operation, the operation identifier comprises a second URL, a control name, and an operation type, wherein the second URL is a URL of a page on which an operated control is located, the control name is a name of the operated control, and the operation type is a type of an operation performed on the operated control.

* * * * *